Aug. 28, 1956 A. E. MILLER 2,760,507
DEMAND PRESSURE REGULATOR
Filed Feb. 7, 1952 2 Sheets-Sheet 1

INVENTOR.
Arthur E. Miller
BY Walter H. Popp.
Attorney.

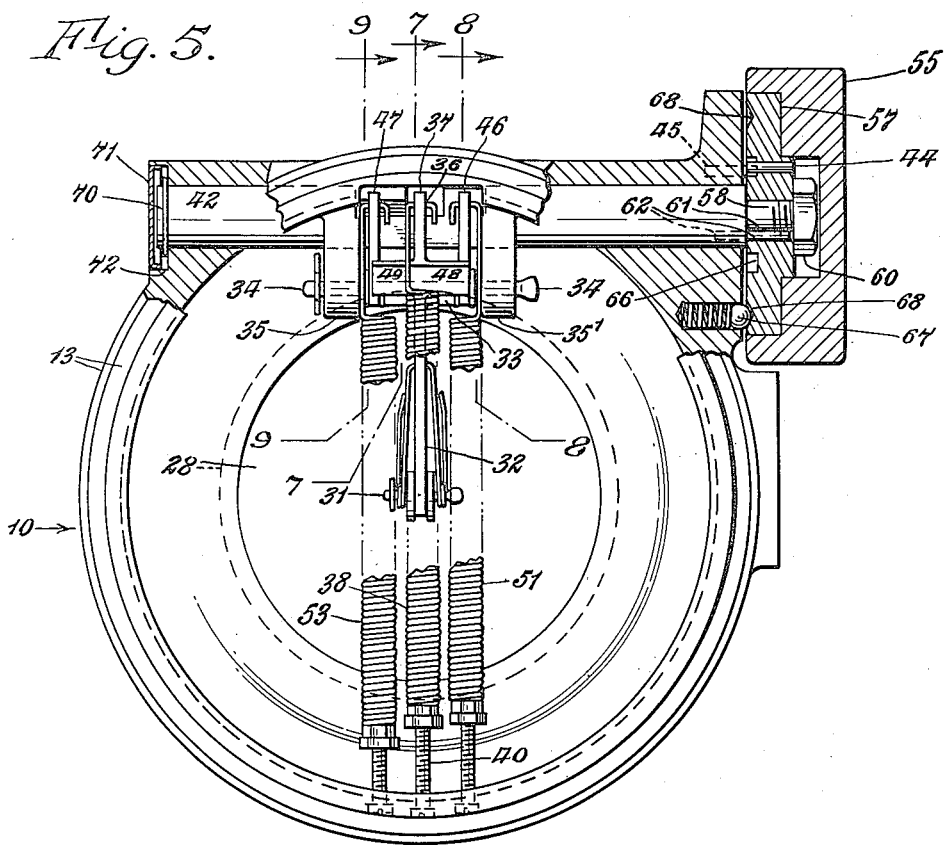
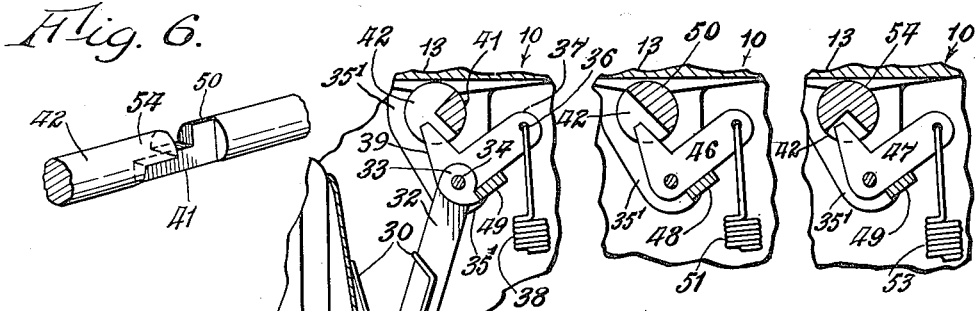

United States Patent Office 2,760,507
Patented Aug. 28, 1956

2,760,507

DEMAND PRESSURE REGULATOR

Arthur E. Miller, Kenmore, N. Y., assignor to Scott Aviation Corporation, Lancaster, N. Y.

Application February 7, 1952, Serial No. 270,438

6 Claims. (Cl. 137—64)

This invention relates to a demand regulator for use as a component part of a breathing apparatus of the demand type, and related more particularly to an oxygen demand regulator for use at varying altitudes, and having provision for optionally operating at either negative inhalation pressure or at any one of several, positive, inhalation pressures.

The particular object of the invention is to provide an oxygen demand regulator for altitude flying which will provide a series of differing positive pressures which are not an arithmetic function of altitude, i. e., in which the different pressures for different altitudes are not directly proportional to their respective altitudes. Other collateral objects of the invention and practical solutions thereof are disclosed in the following specification and in the appended drawings, wherein:

Fig. 5 is an enlarged front elevation of the regulator, with the cover removed, and a number of other parts broken away.

Fig. 6 is a fragmentary perspective view of the multiple cam shaft.

Fig. 7 is an enlarged, fragmentary, vertical section through the regulator showing the primary actuating lever in its operative position—this section being taken on a line indicated by the line 7—7 of Fig. 5 but with the parts in a different position than that shown in Figs. 1–6, incl.

Fig. 8 is an enlarged, fragmentary, vertical section somewhat similar, in general, to Fig. 7, but showing the first floating lever in its operating position—this section being taken on a line indicated by the line 8—8 of Fig. 5, but with the parts in a different position than that shown in Figs. 1–7, incl.

Fig. 9 is another enlarged, fragmentary, vertical section quite similar to Fig. 8, but showing the second floating lever in its operating position—this section being taken on a line indicated by the line 9—9 of Fig. 5, but with the parts in a different position than that shown in Figs. 1–8 incl.

Similar characters of reference indicate like parts in the several figures of the drawings.

Figure 1:
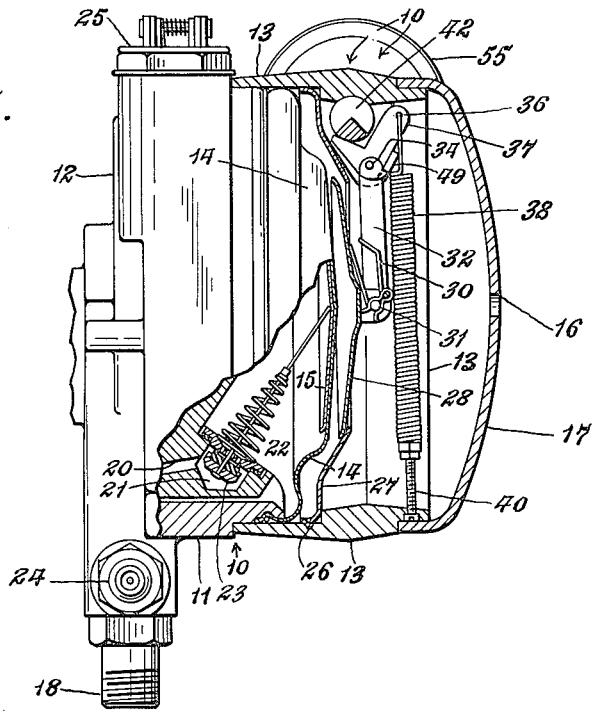
Fig. 1 is a left side elevation of the entire regulator, with parts broken away.

Turning first to Fig. 1, the numeral 10 indicates the hollow, annular case of the regulator constituted of a main casing 11 (with a rear, imperforate wall 12) and a supplemental annular casing sleeve 13, detachably secured to the main casing 11. Approximately in the middle of the case 10 is arranged the usual diaphragm 14, constructed preferably of synthetic rubber, and provided concentrically on its rear face with the usual, conical stiffener disk 15 cemented thereto. The outer or front face of said diaphragm is open to the atmosphere through the hole 16 of casing cover 17.

Oxygen (or other breathing fluid) is fed into the regulator at substantially constant pressure through inlet nipple 18 from whence the oxygen passes through channel 20 to the high pressure chamber 21 from whence it passes into the breathing chamber 22 whenever the demand valve 23 is actuated by an inward movement of the diaphragm 14. The breathing chamber 22 is tubularly connected, in the usual and well known manner, with a face mask (not shown). Thus, whenever the person wearing the mask inhales, the diaphragm 14 is forced rearwardly under the influence of atmospheric pressure, thereby opening the demand valve 23 and allowing oxygen to pass into the breathing chamber 22 and thence to the mask. For exhalation the breathing mask (not shown) is, of course, provided with the usual exhalation valve or exhalation sponges.

The case 10 is also preferably provided with a high pressure safety valve 24, and a hinged cover 25 which latter keeps the dust out of the regulator when the mask hose is detached from the regulator.

Secured by a prick-point dimple at 26 in the bore of the case 10 is a sheet metal, ring shaped, tapered stop 27 whose lower portion is adapted to limit outward movement of the lower portion of a sheet metal, conical, pressure plate 28, this outward movement being effected resiliently by a V shaped, anti-rattling spring 30, whose function will be described presently.

Pivoted at 31 to the central, outer face of the pressure plate 28 is multiple pronged primary lever 32 whose intermediate portion or hub 33 (see Figs. 1, 5, and 7) is journaled on a horizontal pin 34. The opposite ends of this pin 34 are suitably mounted in the case 10 on a pair of lugs 35, 35'.

Pivoted at 36 to the outer, upwardly extending arm 37 of the primary lever 32 is a primary, tension spring 38 whose lower end is adjustably connected to the case 10 by a primary adjusting screw 40. In the position of Fig. 1 this primary spring is rendered ineffective because of the position of the primary, triangular-shaped lobe 41 of the cam shaft 42—said lobe 41 bearing down on the cam arm 39 of the primary lever 32 and thereby holding the pressure plate 28 out of engagement with the diaphragm 14. Hence, in this position, the pressure plate 28 is totally ineffective, and hence the regulator functions in the manner of an ordinary, negative-pressure, demand regulator. In other words, the person using the regulator must, in inhaling, drop the pressure in the breathing chamber 22 below ambient pressure before he will obtain oxygen as a consequence of the opening of the demand valve 23.

If it were practical to keep the various machining tolerances very minute, this position of the primary lever 32 could be relied upon to press the entire periphery of pressure plate 28 firmly against its annular stop 27. But such fine tolerances are not required. With the use of proper dimensions and very coarse tolerances, the aforesaid pressure plate 28 is bound to be positioned rearwardly of its annular stop 27 in some such position as that shown in Fig. 1. But, in such a position, the pressure plate 28 would rattle against its annular stop 27 because of airplane vibrations if not otherwise taken care of, and it is to prevent this rattling that is the function of anti-rattling spring 30, aforedescribed, which resiliently, but firmly tilts the lower portion of said pressure plate 28 against the adjacent inner face of its annular stop 27.

Figure 2:
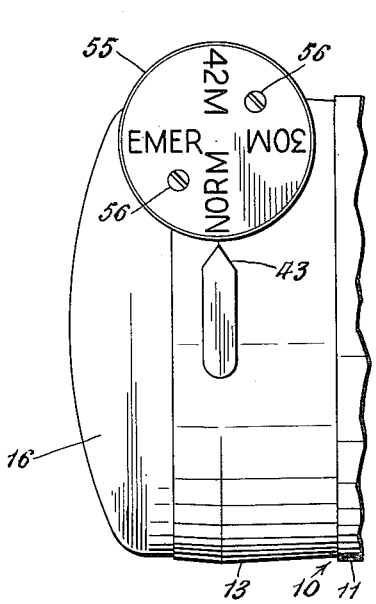
Fig. 2 is a fragmentary right side elevation of the regulator.

If the cam shaft 42 is now turned 90° from the "normal" position of Figs. 1 and 2 to the position of Fig. 7

(counter-clockwise in Figs. 1 and 7), the primary lobe 41 of the cam shaft 42 will have turned enough to free the primary lever 32 and allow the pressure plate 28 to resiliently bear inwardly against the diaphragm 14. This will change the regulator to a positive-pressure regulator so as to compensate for the lower ambient pressure at this elevation which, as illustrated here, is assumed to be 30,000′ (marked 30M in Fig. 2). The desired resilient force exerted upon the diaphragm 14 for this particular elevation is adjusted by a suitable adjustment of the primary spring adjusting screw 40.

Under these conditions the pressure plate 28 is free to move in or out with the diaphragm 14, under the influence of the primary spring 38 and the pressure in the breathing chamber 22 and the ambient pressure, as the person using the regulator inhales and exhales. This is because the primary lever 32 is completely out of control of the cam shaft 42 in this position of said cam shaft. It should also be noted that said cam shaft can be given two more 90° partial rotations (counter-clockwise in Fig. 7) without the primary cam lobe 41 in any way interfering with the to and fro movement of primary lever 32. When these two additional 90° movements have been effected, the cam shaft 42 will have rotated (clockwise in Fig. 2) so that the legend "Emer." (emergency) will have arrived at the indicator prong 43 and prevented from going any further because of the pin 44 coming into contact with the stop pin 45 which latter is mounted on the case 10.

Journaled on the pin 34 at opposite sides of the primary lever 32 are a secondary, bell-crank-shaped, floating lever 46 (Fig. 8) and a similar, tertiary, bell-crank-shaped, floating lever 47 (Fig. 9). Each of these floating levers is adapted to resiliently bear against one or other of the extensions 48 and 49 which are formed integrally with the primary lever 32. In the position of Figs. 1 and 2 all three levers are held in their inoperative position by the cam shaft 42. When said cam shaft has moved 90° (counter-clockwise) from the position of Fig. 1 to the position of Fig. 7 the primary lever 32 is enabled to be unrestrained but both floating levers 46 and 47 are still restrained. Upon a further 90° movement, the secondary, semi-circular cam lobe 50 moves to the position of Fig. 8 and frees its secondary, floating lever 46 which rotates under the influence of its tension spring 51 until its outer arm strikes the one extension 48 of the primary lever 32. Under these conditions the resilient force of said secondary spring 51 is added to that of primary spring 38 in resiliently urging the pressure plate 28, and hence also the diaphragm 14, inwardly. This corresponds (as illustrated in the drawings) to an elevation of 42,000′ (42M).

It is to be particularly noted that each of said springs 38 and 51 (as well as the tertiary spring 53) are individually adjustable. This means that the correct resilience can be obtained against the diaphragm 14 for each elevation independently. This is vital because it is known that the desired resilience for different elevations is not a direct arithmetic function of these elevations, such as is obtained when a single spring or aneroid is used for all elevations.

When the cam shaft 42 is turned a further 90° from the position of Fig. 8 to the position of Fig. 9 (counter-clockwise) the tertiary cam lobe 54 rotates to such position as to entirely free the second floating lever 47. In this position, the "emergency" position (Emer.) all three tension springs 38, 51 and 53 are functioning and the diaphragm 14 is resiliently urged inwardly to a maximum extent by all three tension springs.

Manual partial rotation of the cam shaft 42 is effected by a knurled turning knob or wheel 55 which is secured by flat head screws 56 to a metal disk 57. The latter fits over the threaded end 58 of the cam shaft 42 and is secured thereto by a nut 60. Rotation of said metal disk 57 relatively to the cam shaft 42 is prevented by providing said disk with an internally broached keyway 61 which fits snugly over an eccentric pin 62 arranged on the shoulder 63 of the cam shaft 42. Any rotation of said cam shaft 42 in either direction beyond the three times 90° semi-rotation (270° and four positions) is limited by stop pins 45 and 64 which are secured to the casing 10, and one other of which is adapted to engage with the stop pin 44 which is secured eccentrically to the metal disk 57. A suitable, concentric, annular groove 66 is formed on the inner face of said metal disk 57 so as to prevent any interference between said disk and the stop pins 45, 64.

To resiliently hold said metal disk 57, and hence also the wheel 55, definitely in each of four positions, a spring loaded ball detent 67 is arranged in the case 10, off center from the cam shaft 42, and adapted to engage any one of four detent pockets 68 formed on the inner vertical face of the metal disk 57.

A snap ring 70 is detachably arranged in the opposite end of the cam shaft 42 to prevent its sliding longitudinally out of place. To prevent any dust from working in at this point, an annular, flanged, sheet-metal cap 71 is pressed into the enlarged bore 72 which is formed in the case 10 at the adjacent end of the cam shaft 42.

Figures 3, 4:
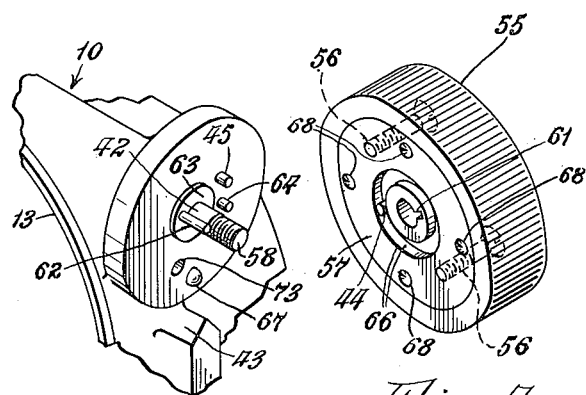
Fig. 3 is an enlarged, fragmentary, perspective view of some of the control parts which are associated with the actuation of the multiple cam shaft—with the operating wheel removed.
Fig. 4 is an enlarged, perspective view of said operating wheel, detached from the rest of the regulator.

The hole 73 (Fig. 3) is merely to allow a drill to form the necessary holes in studs 35 and 35′ to receive the pin 34.

I claim:

1. A demand regulator comprising: a case adapted to be connected to a breathing mask; a diaphragm arranged in said case and adapted to be moved in response to pressure variations in the case induced by breathing; a demand valve operatively connected with said diaphragm and adapted to be tubularly connected to a source of breathing fluid; a pressure plate movably connected to said case; resilient means for resiliently pressing said pressure plate against said diaphragm; means for retracting said pressure plate; a stop connected with said case and adapted to limit the retractive movement of one edge of said pressure plate; an anti-rattle spring for resiliently tilting said pressure plate against said stop; and means for rendering the resilient means inoperative.

2. A demand regulator comprising: a case adapted to be connected to a breathing mask; a diaphragm arranged in said case and adapted to be moved in response to pressure variations in the case induced by breathing; a demand valve operatively connected with said diaphragm and adapted to be tubularly connected to a source of breathing fluid; a lever pivoted to said case; a pressure plate pivoted on said lever; resilient means connected with said lever for resiliently pressing said pressure plate against the diaphragm; means for retracting said lever; a stop connected with said case and adapted to limit the retractive movement of one edge of said pressure plate; and means for rendering the resilient means inoperative.

3. As in claim 2 with the pressure plate of disk shape and the stop of ring shape and disposed substantially concentric with respect to the pressure plate.

4. A demand regulator comprising: a case adapted to be connected to a breathing mask; a diaphragm arranged in said case and adapted to be moved in response to pressure variations in the case induced by breathing; a demand valve operatively connected with said diaphragm and adapted to be tubularly connected to a source of breathing fluid; a pressure plate movably connected to said case; primary and secondary resilient means for resiliently pressing said pressure plate against the diaphragm; and means for allowing first said primary resilient means and thereafter said primary and secondary resilient means to act upon said pressure plate.

5. A demand regulator comprising: a case adapted to be connected to a breathing mask; a diaphragm arranged in said case and adapted to be moved in response to pressure variations in the case induced by breathing; a demand valve operatively connected with said diaphragm and adapted to be tubularly connected to a source of breathing fluid; a pressure plate movably connected to said case; a primary lever pivoted on said case and movably connected with said pressure plate and having a lateral extension; a floating lever which in its free position bears against said extension; independent resilient means for actuating each of said levers; and a dual cam arranged to first free said primary lever and thereafter free said floating lever.

6. As in claim 5 with the further limitation that there be a plurality of independent, floating levers and a multiple cam for first freeing the primary lever and thereafter freeing the floating levers in succession.

References Cited in the file of this patent

UNITED STATES PATENTS

| | | |
|---|---|---|
| 2,437,462 | Frye | Mar. 9, 1948 |
| 2,534,959 | Deming | Dec. 19, 1950 |
| 2,627,866 | Holmes | Feb. 10, 1953 |